INVENTOR.
Horace D. Hume
BY
Greek Wells
Atty.

Dec. 8, 1959   H. D. HUME   2,916,137
CROP LOADER
Filed July 5, 1957   4 Sheets-Sheet 2
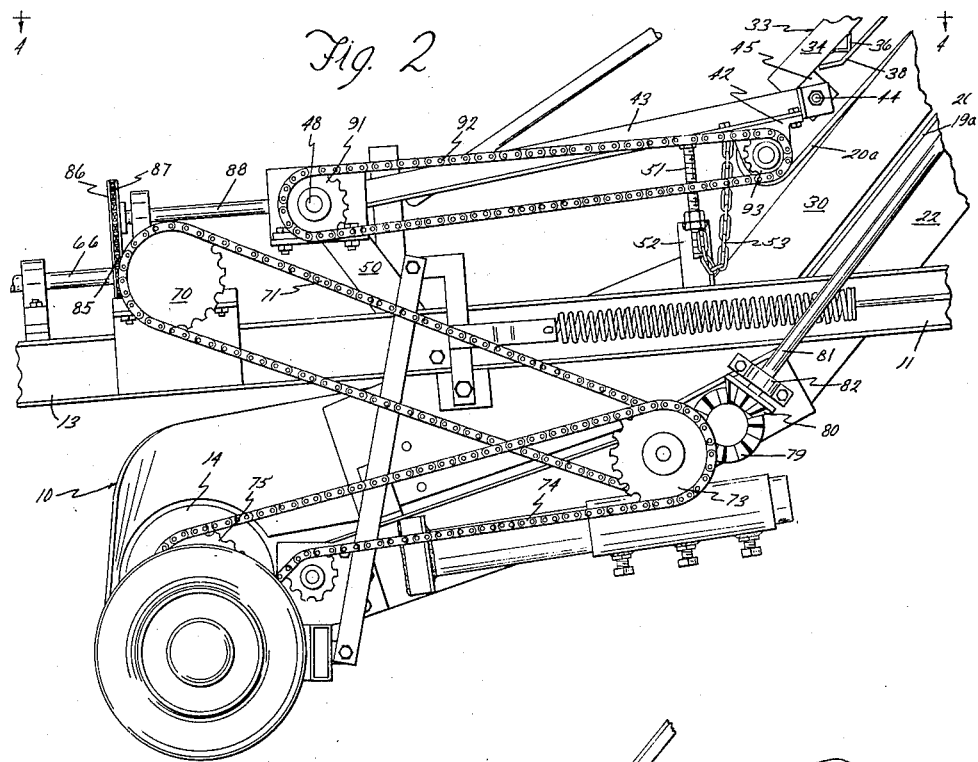
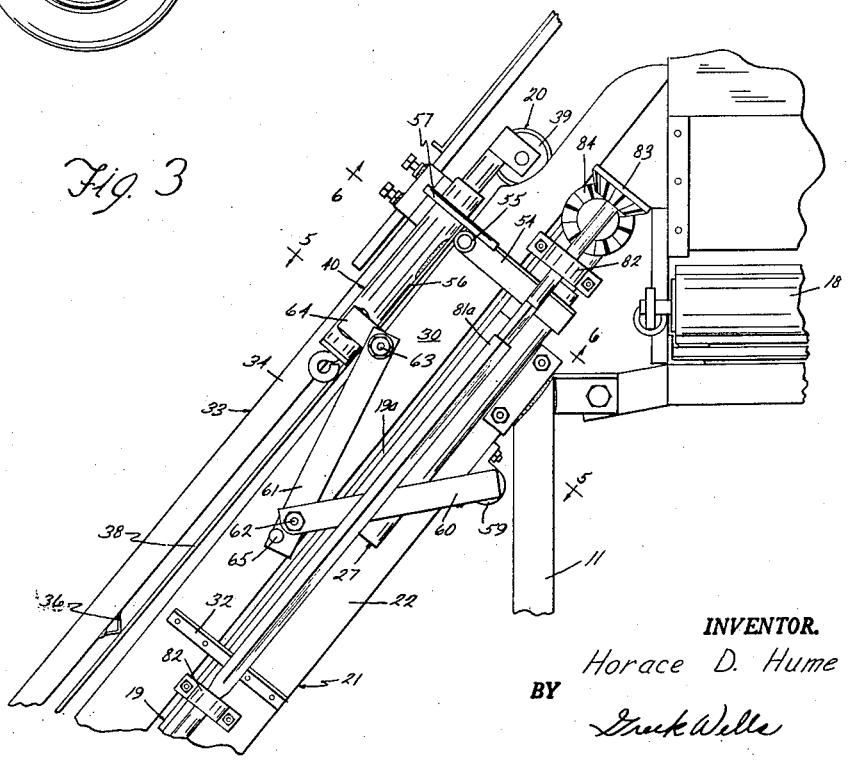
INVENTOR.
Horace D. Hume
BY
Frank Wells
Atty.

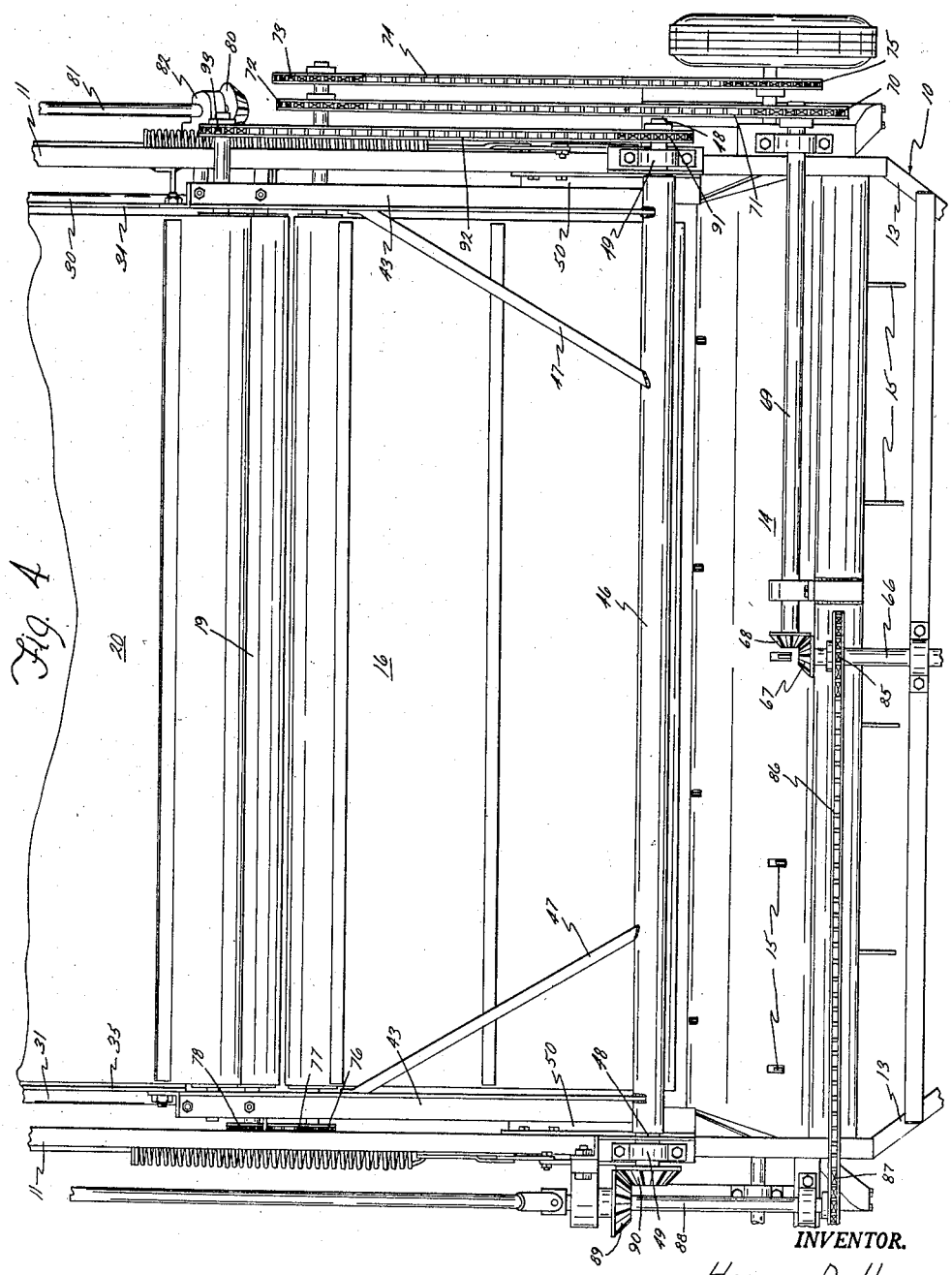

Dec. 8, 1959     H. D. HUME     2,916,137
CROP LOADER
Filed July 5, 1957     4 Sheets-Sheet 4
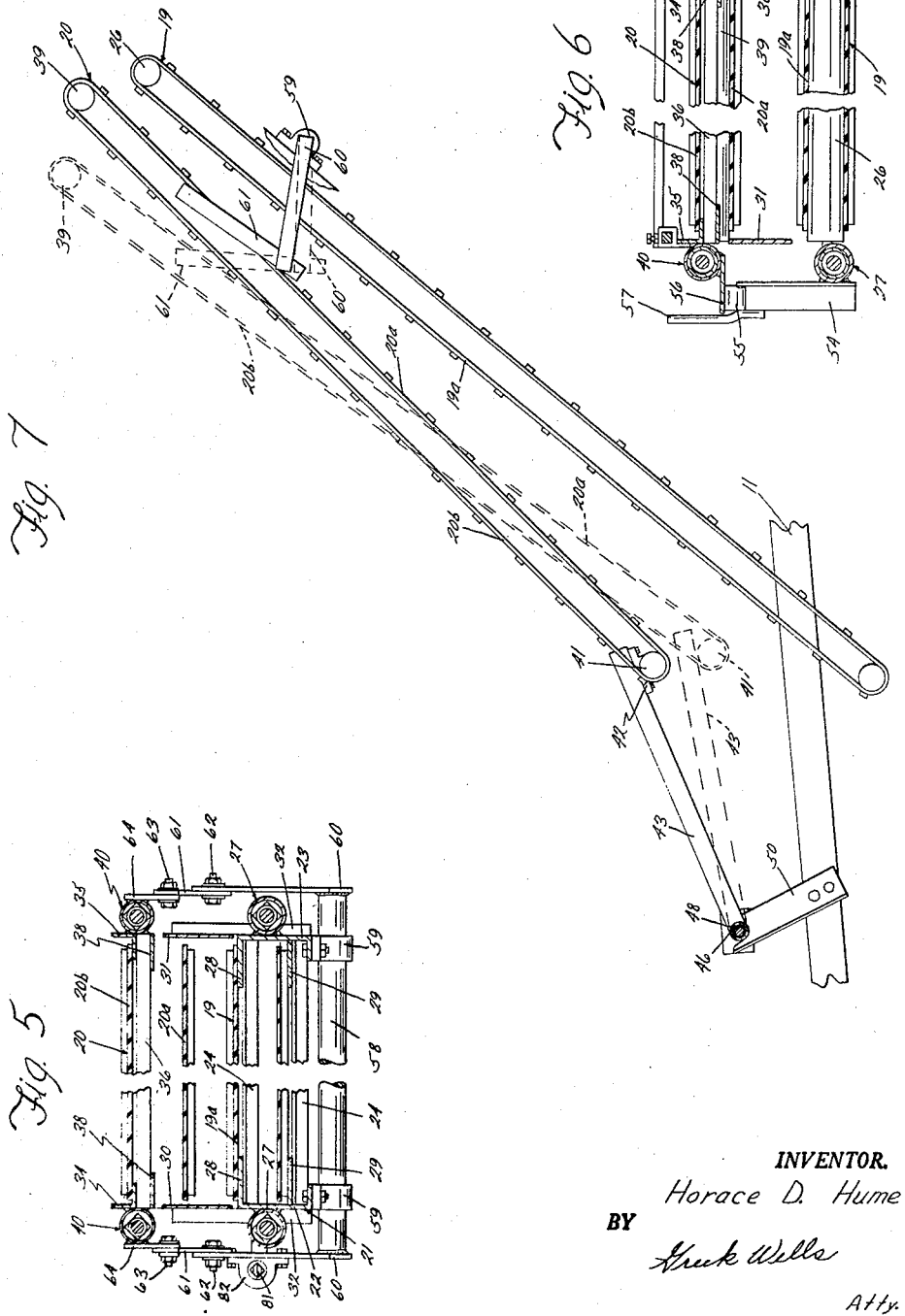
INVENTOR.
Horace D. Hume
BY
Kirk Wells
Atty.

United States Patent Office 2,916,137
Patented Dec. 8, 1959

2,916,137

CROP LOADER

Horace D. Hume, Mendota, Ill.

Application July 5, 1957, Serial No. 670,256

7 Claims. (Cl. 198—165)

The present invention relates to improvements in crop loaders.

In the harvesting of vine crops such as peas, beans, lima beans and the like, and also in the harvesting of certain hay or grain crops, a two stage harvesting method has been found very satisfactory. This method involves first cutting and windrowing the crop, and then picking up the windrowed crop for further processing remote from the field. In this harvesting method, an efficient crop loader is an essential tool. Crop loaders for this purpose are well known in the industry, and usually comprise a pick up element, an elevating conveyor, and a delivery conveyor at the top of the elevating conveyor for delivering the elevated crop to a transporting device such as a truck or wagon. In crop loaders of this type, the elevating conveyor is usually arranged at a steep angle to provide sufficient elevation and compactness of construction. This conveyor normally comprises spaced apart upper and lower draper belts which receive the crop therebetween to elevate it at the steep angle. The upper conveyor is necessary to hold the crop from tumbling backwards.

In elevating conveyors of this character, difficulty is experienced in that the upper and lower drapers are generally fixed in relation to each other, and tend to become jammed or clogged when an unusually large bunch of vine is pulled between them. Conveyors of this type are also unsatisfactory for the reason that the upper and lower conveyors tend to pack the crops during transportation from the lower end to the upper end, and render them less manageable for further processing.

It is the principal purpose of this invention to provide a crop loader having an elevating conveyor comprised of a lower draper and an upper draper, and having the upper draper mounted for free bodily movement toward and away from the lower draper whereby to ride upon the crop being elevated, without compressing the crop and to prevent clogging or jamming of the crop.

A further purpose of the invention is to provide in such a device, means for driving the free floating upper draper in any position thereof, and without interfering with the floating action thereof.

Still another purpose of the invention is to provide in such a device, means to maintain the upper draper level with respect to the lower draper in a transverse direction to prevent twisting and straining of the device.

The nature and advantages of my invention will appear more fully from the following description and the accompanying drawings. It should be understood however, that the drawings and description are illustrative only, and are not intended to limit the invention except insofar as it is limited by the claims.

In the drawings:

Figure 1 is a longitudinal sectional view through a crop loader embodying my invention;

Figures 2 and 3, taken together, constitute an enlarged side view of the loader;

Figure 4 is a fragmentary plan view looking in the direction of the arrows 4—4 of Figure 2;

Figure 5 is a fragmentary sectional view taken on the line 5—5 of Figure 3;

Figure 6 is a fragmentary sectional view taken on the line 6—6 of Figure 3; and

Figure 7 is a somewhat diagrammatic view illustrating the floating action of the upper draper.

Figure 1:
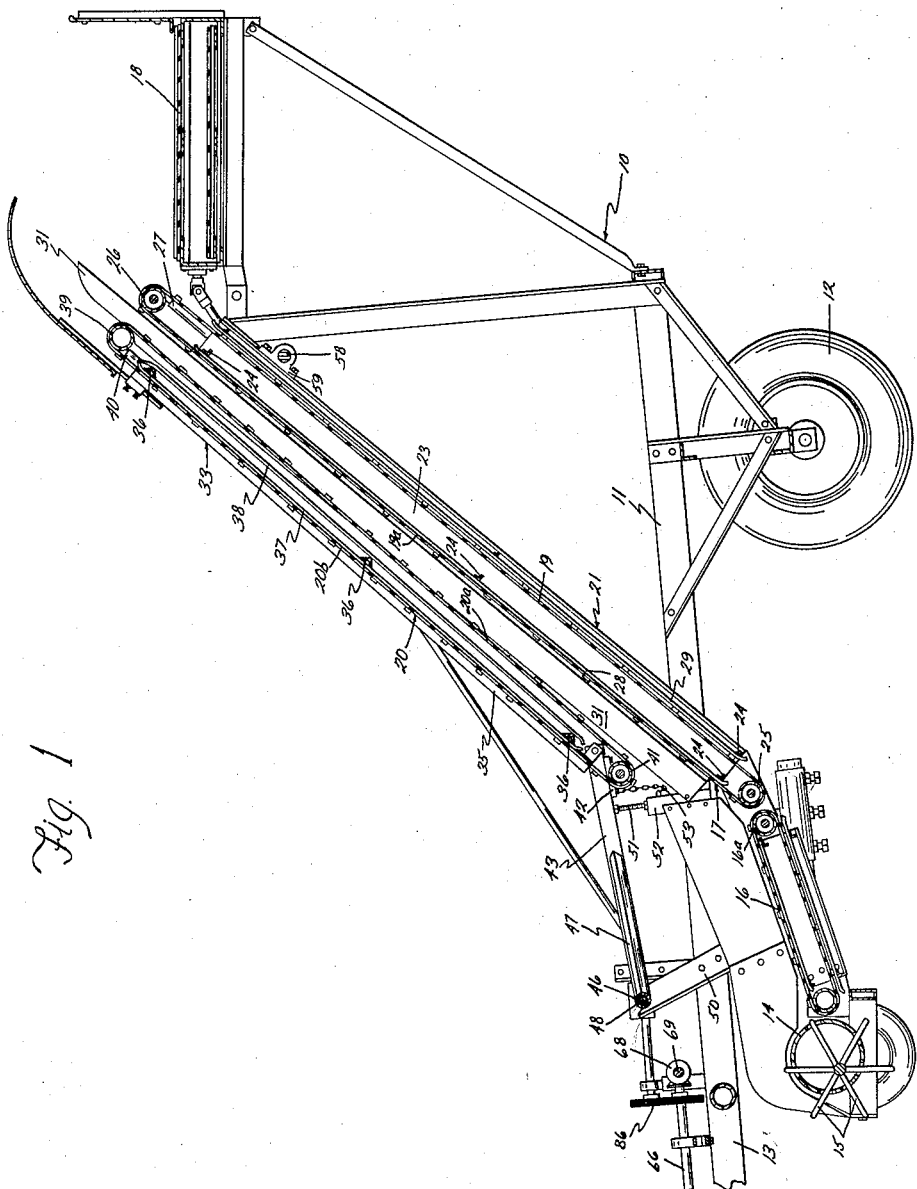

Referring now to the drawings, and to Figures 1, 2 and 3 in particular, my invention is shown as embodied in a crop loader 10 which comprises a main frame 11 having supporting wheels 12 thereon, and having a draw bar 13 extending forwardly therefrom. The frame 11 supports at the front, a pick up drum 14 having pick up fingers 15 eccentrically mounted therein to project and recede with respect to the drum surface as the drum 14 is rotated. Behind the drum 14, a short draper conveyor 16 is mounted which serves to transport crops from the pick up drum 14 to the elevating portion of the loader. Immediately behind the conveyor 16, an elevating conveyor 17 is provided, which extends rearwardly and upwardly on the frame 11. At the upper end of the elevating conveyor 17, a delivery conveyor 18 is supported on the frame 11 to deliver the elevated crop to a transporting vehicle such as a truck or wagon.

My invention relates to the construction and operation of the elevating conveyor 17. The remainder of the loader 10, heretofore described in general terms, is of well known construction and will not be described in detail.

The elevating conveyor 17 comprises a lower draper 19 and an upper draper 20. These drapers have upwardly moving adjacent flights 19a and 20a that receive material between them and carry it upwardly at a steep angle, depositing it upon the delivery conveyor 18. The lower draper 19 is supported by a framework 21, which includes side frame members 22 and 23 and cross bracing members 24. At the lower end of the framework 21 a draper roller 25 is provided. The roller 25 provides the lower rotatable end support for the draper 19. At the upper end of the framework 21 a second draper roller 26 is provided. The roller 26 is supported by spring tensioned mounting devices generally indicated at 27 which are carried by the framework 21. The devices 27, disclosed in detail in my prior Patent No. 2,480,294, urge the roller 26 outwardly to keep the draper 19 taut. Longitudinal guide strips 28 and 29 are provided on the framework 21 and supported by the members 24 as shown in Figures 1 and 5, to support the upper and lower flight respectively of the draper 19 intermediate the rollers 25 and 26. Vertical side shields 30 and 31 are also provided at each side of the upper flight 19a of the draper 19 to confine the conveyed material thereon. The shields 30 and 31 are supported by braces 32 extending upwardly from the side frame members 22 and 23.

The upper draper 20 is supported on a framework 33 above the lower draper 19. The framework 33, as illustrated in Figures 1 and 5, comprises spaced apart longitudinal angle irons 34 and 35, tied together at intervals by transverse angle irons 36. The upper return flight 20b of the draper 20 rides on the inwardly turned flanges of the longitudinal angle irons 34 and 35, and on a central longitudinal strap 37 supported on the angle irons 36 as shown in Figure 1. The lower flight 20a rides against straps 38 secured beneath the transverse angle irons 36. At the upper end of the framework 33 a draper roller 39 is provided. The roller 39 is supported by supporting and tensioning devices 40 secured to the longitudinal angle irons 34 and 35. The devices 40 are constructed in the same manner as the devices 27, and perform the same function. At the lower end of the framework 33, a second draper roller 41 is provided.

The roller 41 is journalled in bearings 42 which are fixed to levers 43 pivoted to the lower end of the framework 33. As best illustrated in Figure 2, the levers 43 are pivoted by bolts 44 to ears 45 depending from the longitudinal angle irons 34 and 35 of the framework 33. The levers 43 extend forwardly above the short conveyor 16 and are fixed at their forward ends to a transverse sleeve 46 (see Figure 4). Diagonal braces 47 also extend from the sleeve 46 to the levers 43. The sleeve 46 is rotatably supported on a transverse shaft 48 which is journalled in bearings 49 that are fixed at the top of upright posts 50 rigidly connected to the main frame 11 of the loader 10. With this construction, the lower draper roller 41 is supported for free vertical movement about the shaft 48 as a center. The framework 33 is pivotally attached to the levers 43 and thus supported for free floating movement above the lower draper 19, as demonstrated in Figure 7. As will hereinafter be described, the upper end of the framework 33 is not rigidly connected to the main frame either, so that it is entirely free to float also. The upper draper 20, not having a fixed position, merely rides upon the material being conveyed, rising and falling according to the bulk of material beneath it. Since the draper 20 is not rigidly mounted, there is no possibility of clogging or jamming. The only load on the conveyed material is the weight of the frame 33 and draper 20, so the crop is not unduly compressed, and arrives at the delivery conveyor in its original loose condition.

It is necessary, of course, to provide means to support the draper 20 when there is no crop beneath it, to prevent it from engaging and possibly entangling with the lower draper 19. This support is provided at the bottom end of the draper 20 by a pair of adjustable stop members 51 which are positioned beneath the lever arms 43 to limit their downward movement. The stop members 51 thread into supporting brackets 52 mounted on the main frame 11. Limit chains 53 are also connected between the frame 11 and the lever arms 43 to prevent them from raising too high.

At the upper end of the drapers 19 and 20, a slightly different stop means is provided. As shown in Figures 3 and 6, each of the roller supporting devices fixed to the lower draper frame 21 has an upwardly extending bar 54 fixed thereto which has a cylindrical stop lug 55 mounted thereon. The roller supporting devices 40 carried by the upper draper framework 33 have plates 56 fixed thereon which engage with the stops 55 and support the upper end of the framework 33 above the lower draper 19. Diverging vertical guide members 57 are fixed to the upstanding members 54 and project upwardly and outwardly above them to guide the framework 33 into proper alignment with the stop members 54 and 55.

Crops conveyed between the drapers 19 and 20 are not always spread evenly in a transverse direction, and will often tend to raise one side of the upper draper 20 higher than the other side. This action, of course, tends to warp the framework 33 and introduce undesirable stresses. In order to prevent such warping, I provide means near the upper end of the drapers 19 and 20 to maintain the upper draper 20 level. As illustrated in Figure 5, a cross shaft 58 is journalled beneath the lower draper framework 21 in bearings 59 supported thereon. The shaft 58 projects outwardly at each side of the framework 21 and has a lever 60 fixed at each end. The levers 60 have second levers 61 pivoted thereto by bolts 62. The levers 61, as shown in Figure 3, are pivoted by bolts 63 to ears 64 attached to the roller supporting devices 40 secured on the framework 33. With this construction, any upward movement of one side of the framework 33 is communicated through the levers 60 and 61 to the cross shaft 58, which transmits the movement to the opposite side of the frame 33 through the levers 60 and 61 on that side, thus maintaining the framework 33 constantly level in a transverse direction.

In order to provide limit means for the upward movement of the upper ends of the framework 33, and to prevent levers 60 and 61 from passing the pivot points 62 through center and reversing direction, and thus getting in the way of the stop means 54—56, I provide a small lug 65 on each lever 61 between the pivot point 62 and the adjacent end of the lever 61. When the levers 60 and 61 approach an angle of divergence near 180 degrees, this lug 65 engages the lever 60 and prevents further upward movement of the frame 33. It also prevents the levers 60 and 61 from reversing direction.

In order to drive the several working elements of the loader 10, I provide a main power shaft 66, journalled on the drawbar 13 of the loader 10 and extending forwardly for connection, through a universal shaft (not shown) to the power take-off point of the towing vehicle (not shown) which is utilized to move the loader through the fields. The power shaft 66 has a bevel gear 67 thereon (see Figure 4) which meshes with a second bevel gear 68 to drive a shaft 69 that provides power for the pick up drum 14 and the short conveyor 16. As shown in Figure 2, the shaft 69 carries a sprocket 70 which, through a chain 71, drives a sprocket 72 fixed to the rear draper roller 16a of the short conveyor 16. A second sprocket 73 is also fixed to the roller 16a and, through a chain 74, drives the pick up drum sprocket 75.

Power for the draper 19 is supplied by a drive sprocket 76 fixed to the opposite end of the roller 16a from the sprockets 72 and 73. The sprocket 76 has a chain 77 thereon that drives a sprocket 78 fixed to the lower draper roller 25 of the draper 19. Since it is desirable to drive the upper draper roller 26 also to keep the upper flight 19a taut, a bevel gear 79 is fixed to the oppoiste end of the draper roller 25, in mesh with a second bevel gear 80 which is fixed to a shaft 81 extending upwardly alongside the framework 21. The shaft 81 is journalled in bearings 82 fixed to the frame member 22, and carries at its upper end a bevel gear 83 which drives a matching bevel gear 84 fixed to the upper draper roller 26 of the draper 19. Since this roller 26 is mounted for limited movement toward and away from the end of the framework 21, a telescoping portion 81a is provided in the shaft 81.

To drive the upper draper 20 of the elevating conveyor 17, a sprocket 85 is fixed on the main power shaft 66 and provided with a chain 86 that transmits power to a sprocket 87 fixed on a shaft 88 journalled on one side of the main frame 11 (see Figure 4) and extending rearwardly. The shaft 88 carries a bevel gear 89 which is meshed with a bevel gear 90 fixed to the end of the transverse shaft 48 about which the lower roller 41 of the draper 20 pivots on the levers 43. The shaft 48 has a drive sprocket 91 fixed at the end thereof opposite the gear 90. A chain 92 is engaged with the sprocket 91 and with a sprocket 93 connected to the lower draper roller 41 of the draper 20. The chain 92 transmits power to the roller 41 to drive the draper 20. Since the drive sprocket 91 is fixed on the shaft 48 that forms the pivotal axis about which the roller 41 moves, the drive means is unaffected by the floating action of the draper 20, and operates to drive the draper 20 in any position it may assume.

It should be clear from the foregoing that my improved elevator conveyor construction provides a simple and unique elevating conveyor comprising upper and lower drapers adapted to transport crops therebetween, wherein the upper draper is free to float on the crop to exert transporting force without compressing the crop unduly, and to adequately accommodate varying crop loads without danger of clogging or jamming. The unique construction disclosed herein produces a floating upper draper which is entirely free to assume any position required by the condition of the conveyed material, while being positively driven to impart transporting force on the crop. Due to the novel level maintaining mechanism, including elements 58—65, the upper draper 20 is maintained in proper transversely level position to prevent warping and binding which would hinder its free floating action.

It is believed that the nature and advantage of the invention appear clearly from the foregoing description and the accompanying drawings.

Having thus described my invention, I claim:

1. In a crop loading device, a main frame and inclined elevating conveyor means supported on said main frame comprising an inclined lower draper having upper and lower flights, rotatable end supports for said lower draper, drive means for said lower draper connected to one of said rotatable end supports, an upper draper having upper and lower flights, rotatable end supports for said upper draper, a framework supporting said upper draper between said last named rotatable supports, a pair of transversely spaced lever arms pivoted to said framework and extending longitudinally therefrom, means rigidly connecting said arms to prevent movement of one relative to the other, longitudinally fixed pivot means on the main frame pivotally connected to said lever arms at points longitudinally remote from the connections of said lever arms to said framework whereby to guide the framework for bodily movement vertically toward and away from the lower draper and to support said draper against longitudinal movement, and drive means for the upper draper.

2. In a crop loading device, a main frame and inclined elevating conveyor means supported on said main frame comprising an inclined lower draper having upper and lower flights, rotatable end supports for said lower draper, drive means for said lower draper connected to one of said rotatable end supports, an upper draper having upper and lower flights, rotatable end supports for said upper draper, a framework supporting said upper draper between said last named rotatable supports, a pair of transversely spaced lever arms pivoted to said framework and extending longitudinally therefrom, means rigidly connecting said arms to prevent movement of one relative to the other, pivot means on the main frame pivotally connected to said lever arms at points longitudinally remote from the connections of said lever arms to said framework whereby to guide the framework for bodily movement vertically toward and away from the lower draper and to support said draper against longitudinal movement, drive means for the upper draper, a transverse shaft rotatably supported on the main frame, first lever arms fixed to said shaft and extending radially therefrom, and second lever arms pivoted to opposite sides of said framework and to said first lever arms whereby to maintain said framework level in a transverse direction while said framework moves toward and away from said lower draper.

3. In a crop loading device, a main frame and inclined elevating conveyor means supported on said main frame comprising an inclined lower draper having upper and lower flights, rotatable end supports for said lower draper, drive means for said lower draper connected to one of said rotatable end supports, an upper draper having upper and lower flights, rotatable end supports for said upper draper, a framework supporting said upper draper between said last named rotatable supports, a pair of transversely spaced lever arms pivoted to said framework and extending longitudinally therefrom, means rigidly connecting said arms to prevent movement of one relative to the other, longitudinally fixed pivot means on the main frame pivotally connected to said lever arms at points longitudinally remote from the connections of said lever arms to said framework whereby to guide the framework for bodily movement vertically toward and away from the lower draper, and to support said draper against longitudinal movement, drive means for the upper draper, and means on the main frame operable to prevent lateral movement of the framework with respect to the main frame.

4. In a crop loading device, a main frame and inclined elevating conveyor means supported on said main frame comprising an inclined lower draper having upper and lower flights, rotatable end supports for said lower draper, drive means for said lower draper connected to one of said rotatable end supports, an upper draper having upper and lower flights, rotatable end supports for said upper draper, a framework supporting said upper draper between said last named rotatable supports, a pair of transversely spaced lever arms pivoted to said framework and extending longitudinally therefrom, means rigidly connecting said arms to prevent movement of one relative to the other, pivot means on the main frame pivotally connected to said lever arms at points longitudinally remote from the connections of said lever arms to said framework whereby to guide the framework for bodily movement vertically toward and away from the lower draper and to support said draper against longitudinal movement, drive means for the upper draper, a transverse shaft rotatably supported on the main frame, first lever arms fixed to said shaft and extending radially therefrom, and second lever arms pivoted to opposite sides of said framework and to said first lever arms whereby to maintain said framework level in a transverse direction while said framework moves toward and away from said lower draper, said drive means including a first drive element concentric with said pivot means, a second drive element connected to said last named rotatable end support, and power transmission means connecting said first and second drive elements.

5. In a crop loading device, a main frame and inclined elevating conveyor means supported on said main frame, said inclined elevating conveyor means comprising an inclined lower conveyor mounted on said main frame, drive means for said lower conveyor, an upper conveyor positioned above said lower conveyor, drive means connected to said upper conveyor, said upper conveyor being free to move up and down with respect to the lower conveyor and to ride upon crops carried between the conveyors, stop means on the main frame supporting the upper conveyor a fixed distance above the lower conveyor, a pair of guide members pivoted to the lower end of the upper conveyor and extending longitudinally therefrom, pivot means on the main frame spaced longitudinally from the lower end of the upper conveyor, said guide members being pivoted to the pivot means to guide the lower end of the upper conveyor as it moves vertically and to restrain said upper conveyor against substantial endwise movement, and guide means on the main frame connected to the upper end of the upper conveyor and operable to guide the upper end of the upper conveyor vertically independently of the lower end of the upper conveyor, and operable to restrain said upper end of said upper conveyor against transverse movement and transverse tipping.

6. The invention defined in claim 5 wherein the last named guide means comprises a transverse shaft rotatably supported on the main frame adjacent the upper end of said upper conveyor, first lever arms fixed to said shaft and extending radially therefrom, and second lever arms pivoted to said upper conveyor at transversely spaced points, said second lever arms being pivoted to said first lever arms.

7. In a crop loading device, a main frame and inclined elevating conveyor means supported on said main frame, said inclined elevating conveyor means comprising an inclined lower conveyor mounted on said main frame, drive means for said lower conveyor, an upper conveyor positioned above said lower conveyor, drive means connected to said upper conveyor, said upper conveyor being free to move up and down with respect to the lower conveyor and to ride upon crops carried between the conveyors, stop means on the main frame supporting the upper conveyor a fixed distance above the lower conveyor, a pair of guide members pivoted to the lower end of the upper conveyor and extending longitudinally therefrom, longitudinally fixed pivot means on the main frame spaced longitudinally from the lower end of the upper conveyor, said guide members being pivoted to the pivot means to guide the lower end of the upper conveyor as it moves vertically and to restrain said upper conveyor against substantial endwise movement.

References Cited in the file of this patent

UNITED STATES PATENTS

| | | |
|---|---|---|
| 389,538 | Baker | Sept. 18, 1888 |
| 2,490,381 | Shields | Dec. 6, 1949 |
| 2,682,216 | Shields | June 29, 1954 |